United States Patent [19]

Luria

[11] Patent Number: 5,823,472
[45] Date of Patent: Oct. 20, 1998

[54] STOWAGE COMPARTMENT CONSTRUCTION PARTICULARLY FOR AIRCRAFT

[75] Inventor: David Luria, Tel-Aviv, Israel

[73] Assignee: Fuselage Engineering Services Ltd., Tel Aviv, Israel

[21] Appl. No.: 657,952

[22] Filed: Jun. 4, 1996

[51] Int. Cl.[6] .................................................. B64D 11/00
[52] U.S. Cl. .................................... 244/118.1; 244/118.5; 312/266
[58] Field of Search ............................. 244/118.1, 118.5, 244/119; 312/266, 247, 248, 269, 272, 319.2, 7.1, 7.2, 325, 326, 28; 105/321, 315; 5/9, 10

[56] References Cited

U.S. PATENT DOCUMENTS

| 4,073,452 | 2/1978 | Gosau | 244/118.5 |
| 5,383,628 | 1/1995 | Harriehausen et al. | 244/118.1 |
| 5,441,218 | 8/1995 | Mueller et al. | 244/118.1 |

FOREIGN PATENT DOCUMENTS

| 0348130 | 12/1989 | European Pat. Off. | 244/118.1 |
| 4018362 | 12/1991 | Germany | 244/118.1 |

*Primary Examiner*—Galen L. Barefoot

[57] ABSTRACT

A stowage compartment to be mounted in an overhead supporting structure of an aircraft includes a lower compartment section for receiving articles to be stowed and an upper compartment section serving as an outer cover for the lower compartment section. One of the compartment sections is fixed to the supporting structure, and the other is pivotal to a closed position or to an open position with respect to the fixed compartment section. The compartment further includes an inner pivotal cover between the lower compartment section and the upper compartment section, and an inner cover locking mechanism having a handle which is manually accessible to a user, for releasing the inner cover locking mechanism to permit pivoting the inner cover with respect to the lower compartment section, only when the outer cover is in its open position.

20 Claims, 8 Drawing Sheets

STOWAGE COMPARTMENT CONSTRUCTION PARTICULARLY FOR AIRCRAFT

FIELD AND BACKGROUND OF THE INVENTION

The present invention relates to a stowage compartment construction for receiving articles to be stowed. The invention is particularly useful for the construction of stowage compartments in aircraft, and is therefore described below with respect to this application.

Aircraft are conventionally constructed with overhead stowage compartments for stowing various articles of the passengers, crew, and/or the aircraft. If an overhead stowage compartment should accidentally open during flight, there is a serious danger that an article within the stowage compartment, such as an attache case, may be hurled outwardly such as to cause injury or even death, and in fact there have been cases of this occurring. Also, since the articles within a stowage compartment may shift during flight of the aircraft, there is a danger that such an article within the stowage compartment may be moved to a position where it will accidentally fall out as soon as the compartment is manually opened.

OBJECTS AND BRIEF SUMMARY OF THE INVENTION

An object of the present invention is to provide a stowage compartment construction which eliminates, or substantially reduces, the possibility of accidental opening of the stowage compartment such that an article therein may be accidentally hurled out, or the possibility of accidental falling out of an article from the stowage compartment when the stowage compartment is manually opened.

According to a broad aspect of the present invention, there is provided a stowage compartment to be mounted in a supporting structure, comprising a lower compartment section for receiving articles to be stowed, and an upper compartment section serving as an outer cover for the lower compartment section. One of the compartment sections is fixed to the supporting structure, and the other compartment section being pivotal to a closed position or to an open position with respect to the fixed compartment section. A compartment locking mechanism locks the two compartment sections together when the pivotal compartment section is in its closed position with respect to the fixed compartment section. The compartment locking mechanism includes a handle manually engageable by a user for releasing the compartment locking mechanism to permit pivoting the pivotal compartment section to its open position with respect to the fixed compartment section. The stowage compartment further comprises: an inner cover between the lower compartment section and the upper compartment section, and pivotal to a closed position or to an open position with respect to the lower compartment section; and an inner cover locking mechanism for locking the inner cover to the lower compartment section when the inner cover is in its closed position with respect to the lower compartment section, the inner cover locking mechanism also including a handle manually engageable by a user for releasing the inner cover locking mechanism to permit pivoting the inner cover with respect to the lower compartment section. The upper compartment section, in the closed position of said pivotal compartment section, covers the handle of the inner cover locking mechanism such as to permit manual access thereto, in order to release the inner cover locking mechanism, only after the pivotal compartment section has been pivoted to its open position with respect to the fixed compartment section.

According to further features in the described preferred embodiments, the inner cover is of a construction which, when in its closed position, covers the open end of the fixed compartment section to secure the articles therein but permits viewing therethrough of the articles in the lower compartment section. Preferably, the inner cover is of an open screen construction, but may also be of a transparent plastic construction.

According to further features in the described preferred embodiment, the inner cover is automatically closed, and its locking mechanism is automatically locked, by the movement of the pivotal compartment section to its closed position with respect to the fixed compartment section.

Two embodiments of the invention are described below for purposes of example.

In one described embodiment, the lower compartment section is pivotal, downwardly, with respect to the upper compartment section. In this embodiment, the inner cover locking mechanism includes a first locking element for locking the inner cover to the supporting structure, and a second locking element for locking the inner cover to the pivotal lower compartment section. The handle of the compartment locking mechanism is also effective to release the first locking element of the inner cover locking mechanism, to permit the lower compartment section, with the inner cover, to be pivoted to the open position with respect to the fixed upper compartment section.

According to further features in this described embodiment, the stowage compartment further includes a spring biassing the inner cover to an open position with respect to the lower compartment section such that, after the lower compartment section has been pivoted to its open position with respect to the upper compartment section, the inner cover automatically opens upon moving the handle of the inner cover locking mechanism to its releasing position;

According to further features in this described preferred embodiment, the stowage compartment further comprises a pair of locking tongues, and the inner cover is pivotally mounted to the lower compartment section by a pair of brackets secured to the opposite sides of the lower compartment section. A pair of springs biass the inner cover to an open position with respect to the lower compartment section, which springs are secured between the opposite sides of the lower compartment section and arms fixed to the brackets.

In a second described embodiment, the upper compartment section is pivotal, upwardly, with respect to the lower compartment section. In this embodiment, the inner cover underlies the upper compartment section and is also pivotal upwardly with respect to the lower compartment section.

As will be apparent from the description below, both of the described preferred embodiments eliminate, or substantially reduce, the danger of an article within the stowage compartment will be hurled out during flight by the accidental opening of the stowage compartment, or will accidentally drop out when the stowage compartment is manually opened.

Further features and advantages of the invention will be apparent from the description below.

BRIEF DESCRIPTION OF THE DRAWINGS

The invention is herein described, by way of example only, with reference to the accompanying drawings, wherein:

FIG. 7 is a three-dimensional view, partly broken away, illustrating the construction of the stowage compartment of FIGS. 6a–6e in the fully closed condition thereof as shown in FIG. 6a.

DESCRIPTION OF PREFERRED EMBODIMENTS

The accompanying drawings illustrate the invention of the present application as applied to the two most common types of overhead stowage compartment constructions presently used in aircraft. Both types include a lower compartment section for receiving articles to be stowed, and an upper compartment section serving as an outer cover for the lower section, one of the compartment sections being fixed to the supporting structure in which the stowage compartment is mounted, and the other compartment section being pivotal with respect to the fixed section to a closed position or to an open position. FIGS. 1a–5b illustrate the invention incorporated in the type of stowage compartment wherein the lower compartment section is the pivotal one and is pivoted downwardly in order to open the compartment; whereas FIGS. 6a–10 illustrate the invention incorporated in the type of stowage compartment wherein the upper compartment section, serving as the outer cover, is the pivotal one and is pivoted upwardly in order to open the compartment.

The Stowage Compartment of FIGS. 1–5b

Figure 1:
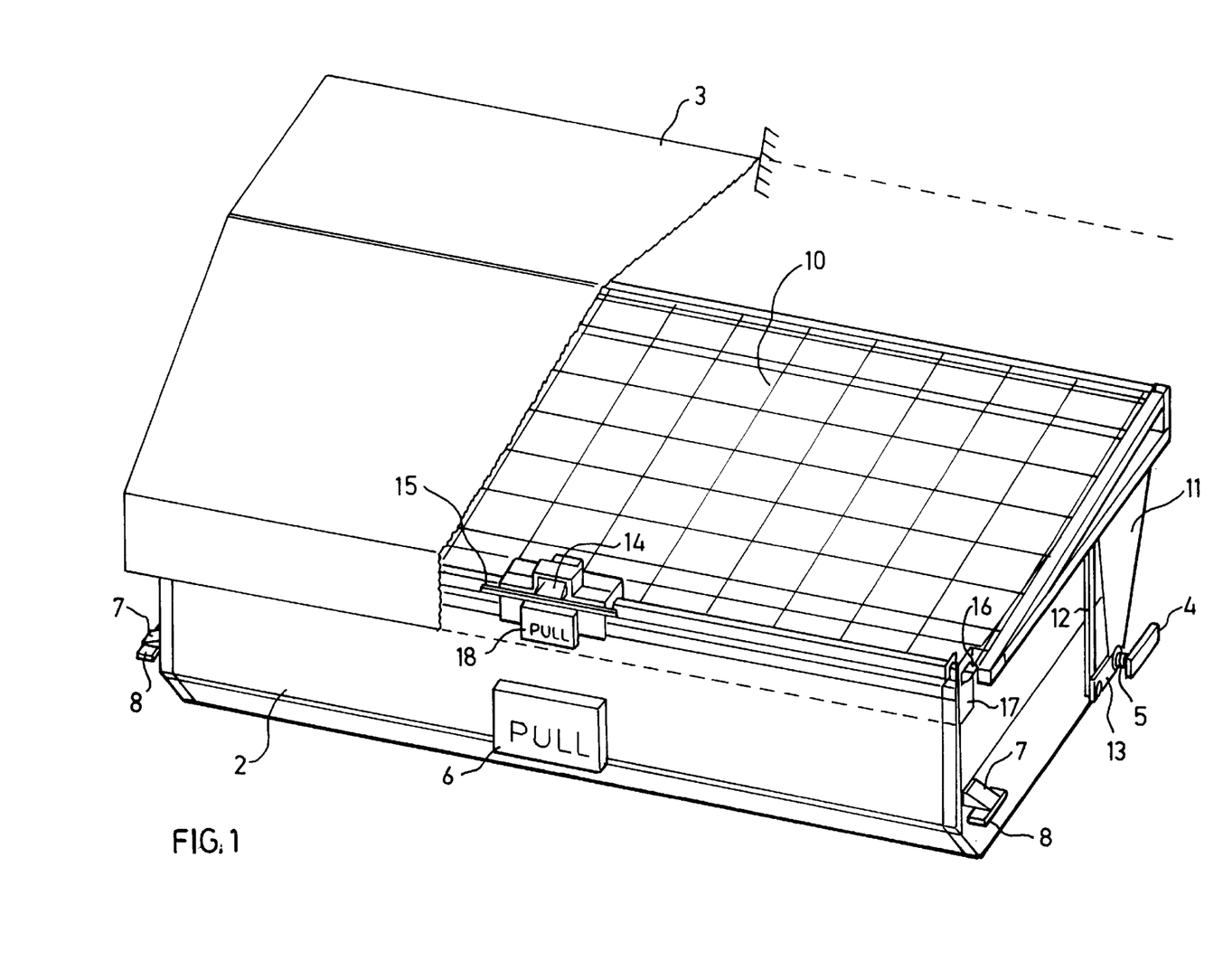
FIG. 1 is a three-dimensional view, partly broken away, illustrating one construction of a stowage compartment in accordance with the present invention.

With reference first to FIG. 1, the stowage compartment includes a lower compartment section 2 for receiving articles to be stowed, and an upper compartment section 3 serving as an outer cover for the lower section. The outer cover 3 is fixed to the aircraft supporting structure 4 in which the stowage compartment is mounted, whereas the lower compartment section 2 is pivotal downwardly about a horizontal pivotal axis 5 to either a closed position (FIG. 2a) or an open position (FIGS. 2c–2e) with respect to the outer cover 3.

The lower compartment section 2 carries a locking mechanism including a handle 6, for automatically locking the lower compartment section 2 in its closed position with respect to the outer cover 3. The lower compartment section 2 is locked in its closed position with respect to the outer cover 3 by a pair of locking tongues 7 normally overlying elements 8 of the fixed supporting structure, but movable by pivoting handle 6 to a release position with respect to these elements 8 to permit pivoting the lower compartment section 2 to its open position with respect to the outer cover 3. Handle 6 is exposed externally of the lower compartment section 2 so that it may be manually engaged by a user and pivoted outwardly to release the lower compartment locking section, and to permit it to be pivoted downwardly about pivotal axis 5 to its open position with respect to the outer cover 3.

Insofar as described above, the stowage compartment illustrated in FIG. 1 may be of a known construction, and therefore further details of its construction or operation are not set forth herein.

According to the present invention, the stowage compartment illustrated in FIG. 1 includes an inner cover, generally designated 10, between the lower compartment section 2 and the outer cover 3. The inner cover 10 is pivotally mounted by a pair of brackets 11 at its opposite sides to the lower compartment section 2 at its pivotal axis 5. Inner cover 10 is also pivotal to a closed position with respect to the lower compartment section 2 or to an open position. The inner cover 10 is normally biassed to the open position by a rubber or metal spring 12 at one or both sides provided between the lower compartment section 2 and an arm 13 secured to the mounting brackets 11 of the inner cover 10 pivotally mounting the inner cover to the lower compartment section 2.

Figure 2A:
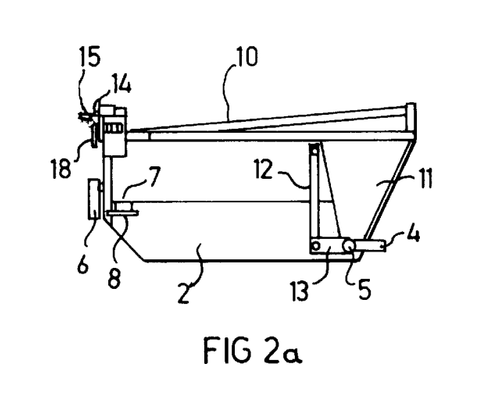
FIGS. 2a–2e diagrammatically illustrate the stowage compartment of FIG. 1, but with the outer cover omitted, in the various conditions of the stowage compartment.
Figure 2B:
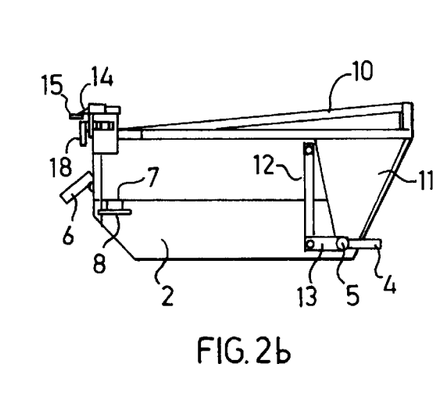
Figure 2C:
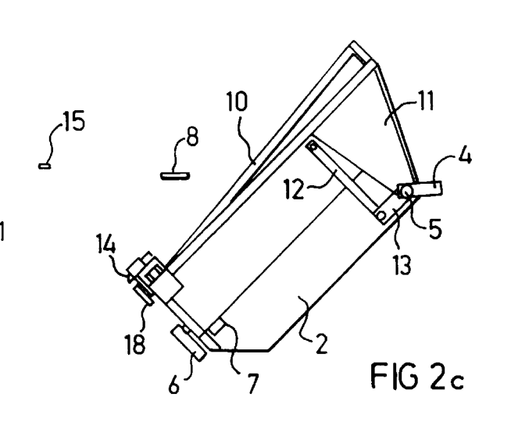
Figure 2D:
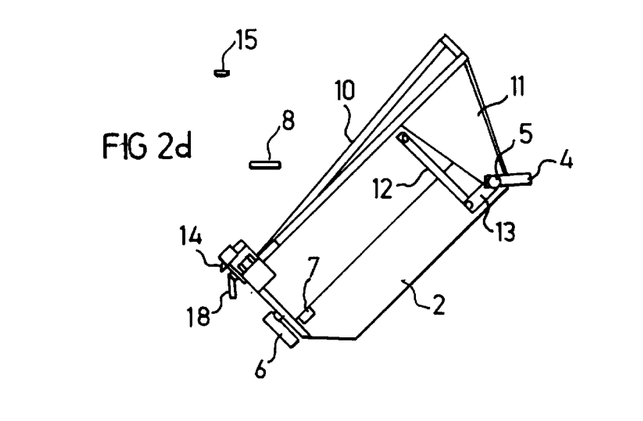
Figure 2E:
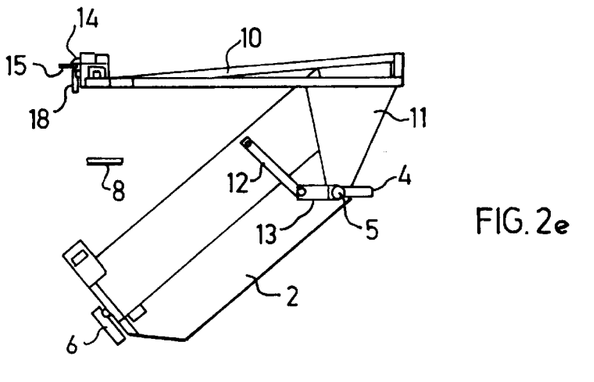

Spring 12 is tensioned (stretched) when the inner cover 10 is in its closed position with respect to the lower compartment section 2 (FIGS. 2a–2d), such that as soon as the inner cover is released for opening, the energy stored within spring 12 automatically pivots the inner cover to its open position shown in FIG. 2e. However, as will be described more particularly below, the locking mechanism for locking the inner cover 10 to the lower compartment section 2 is not accessible to the user for opening the inner cover until after the lower compartment section 2 has been pivoted to its open (lower) position.

Figure 3:
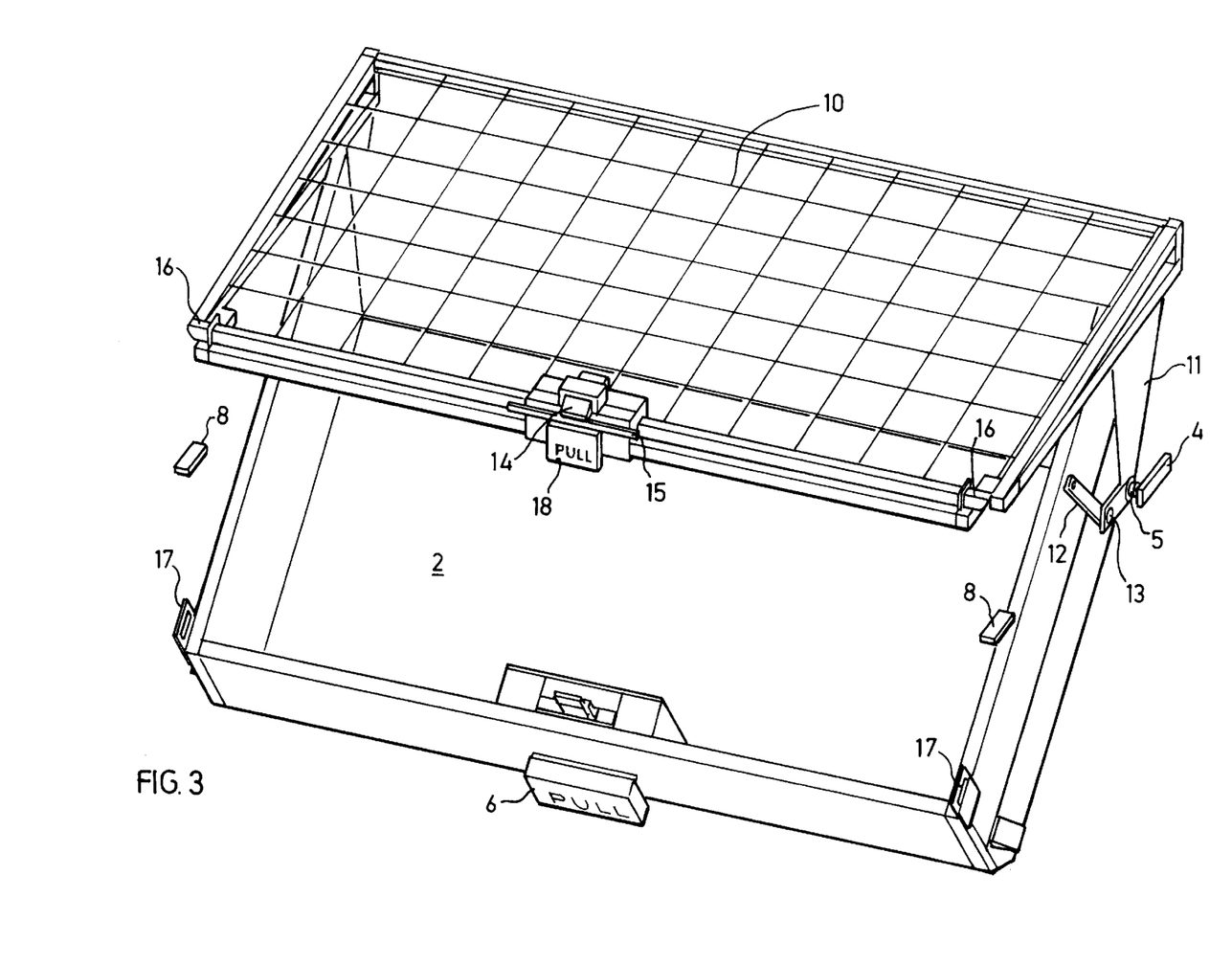
FIG. 3 illustrates the construction of the stowage compartment in its open condition as shown in FIG. 2e.

As particularly shown in FIGS. 1 and 3, the fixed upper compartment section, serving as the outer cover 3, is of a solid construction such that, when the lower compartment section 2 is in its closed position with respect to the outer cover 3, the outer cover secures the contents of the lower compartment section 2 and also prevents access for introducing or removing articles. On the other hand, the inner cover 10 is of an open, flexible screen construction such that when in its closed position it permits viewing the contents of the lower compartment section 2 while preventing its contents from falling out.

The inner cover 10 includes a double locking mechanism, namely a locking tongue 14 movable to either a locking position or a release position with respect to element 15 of the fixed supporting structure, and a pair of locking tongues 16 extending from the opposite sides of the inner cover 10 and movable by handle 18 laterally outwardly to a locking position engageable with elements 17 fixed at the opposite ends of the lower compartment section 2, and inwardly to a releasing position with respect to elements 17 of the lower compartment section 2. Locking tongue 14 is moved to its released position by handle 6 of the lower compartment section locking mechanism as will be described below particularly with reference to FIGS. 5a and 5b; whereas locking tongues 16 are moved to their released positions by a handle 18 carried by the inner cover 10. However, as shown particularly in FIG. 1, handle 18 is covered by the outer cover 3 in the closed position of the stowage compartment so that handle 18 is not accessible to the user for opening the inner cover 10 until the lower compartment section 2, and the inner cover 10, have been pivoted to their open (lower) positions with respect to the outer cover 3.

Figure 5A:
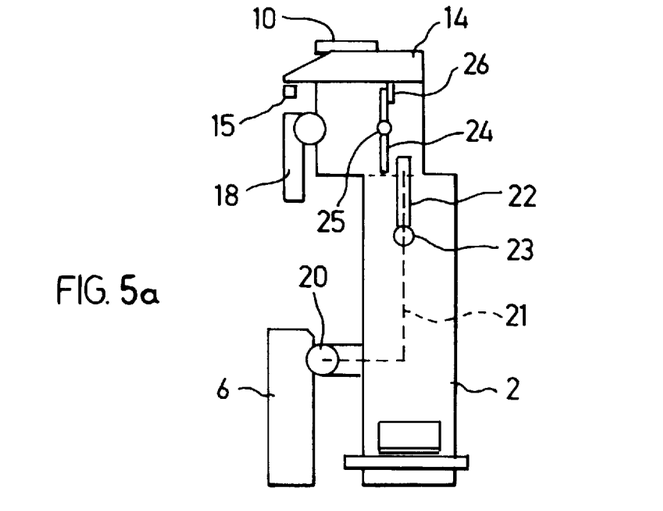
FIGS. 5a and 5b diagrammatically illustrate the operation of the locking mechanisms in FIGS. 4a and 4b.
Figure 5B:
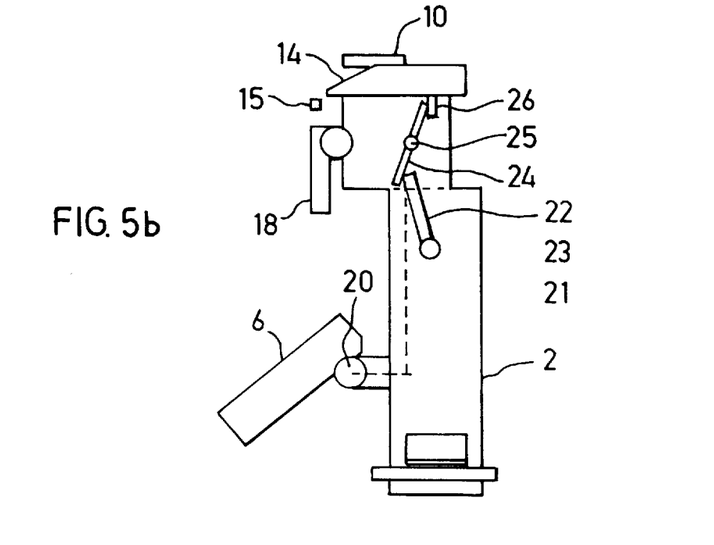

FIGS. 5a, 5b diagrammatically illustrate how handle 6 of the lower compartment section 2 locking mechanism is used for moving locking tongue 14 of the inner cover 10 locking mechanism to its released position with respect to fixed element 15 of the aircraft supporting structure in which the stowage compartment is mounted. Thus, handle 6 is pivotal about axis 20 and is coupled by linkage 21 to a lever 22 pivotal at its lower end about axis 23. The upper end of lever 22 is engageable with the lower end of another lever 24 pivotal about axis 25 and having an upper end engageable with a projection 26 from locking tongue 14. Thus, when handle 6 is pivoted as shown in FIG. 5b, the foregoing mechanism pivots lever 24 (clockwise, FIGS. 5a, 5b) to shift locking tongue 14 (rightwardly) and thereby to release it from fixed element 15 of the supporting structure.

The operation of the stowage compartment as diagrammatically illustrated in FIGS. 2a–2e will now be better understood. Thus, whenever the lower compartment section 2 is in its closed position, as illustrated in FIG. 2a, the inner cover 10 must also be in its closed position and locked both to the supporting structure by its locking tongue 14 engageable with element 15 of the supporting structure, and also to the lower compartment section 2 by its locking tongues 16 engageable with elements 17 of the lower compartment section. The lower compartment section 2 in turn is locked to the fixed supporting structure by its locking tongues 7 engageable with elements 8 of the supporting structure. It will be noted that in this closed condition of the stowage compartment as shown in FIG. 1, the outer cover 3 does not overlie handle 6 of the locking mechanism for the lower compartment section 2, but does overlie handle 18 of the locking mechanism of the inner cover 10 thereby preventing access to handle 18.

In order to open the stowage compartment, handle 6 must be engaged by the user and manually pivoted (FIG. 2b). Pivoting handle 6 moves its locking tongues 7 to a released position with respect to elements 8 of the fixed supporting structure (by conventional mechanism now existing in the conventional stowage compartment constructions of this type). Moving handle 6 also moves locking tongue 14 of the locking mechanism in the inner cover 10 to its released, position with respect to fixed element 15, as diagrammatically shown in FIGS. 5a and 5b and described earlier. However, locking tongues 16 of the locking mechanism in the inner cover 10 remain in their locked positions with respect to elements 17 of the lower compartment section 2.

Accordingly, by pivoting handle 6, the lower compartment section 2 is released for downward pivotal movement about axis 5 to its open (lower) position with respect to the outer fixed cover 3. This downward pivotal movement of the lower compartment section 2 also carries with it the inner cover 10 which remains locked to section 2 by locking tongues 16. This is the condition illustrated in FIG. 2c.

Figure 4A:
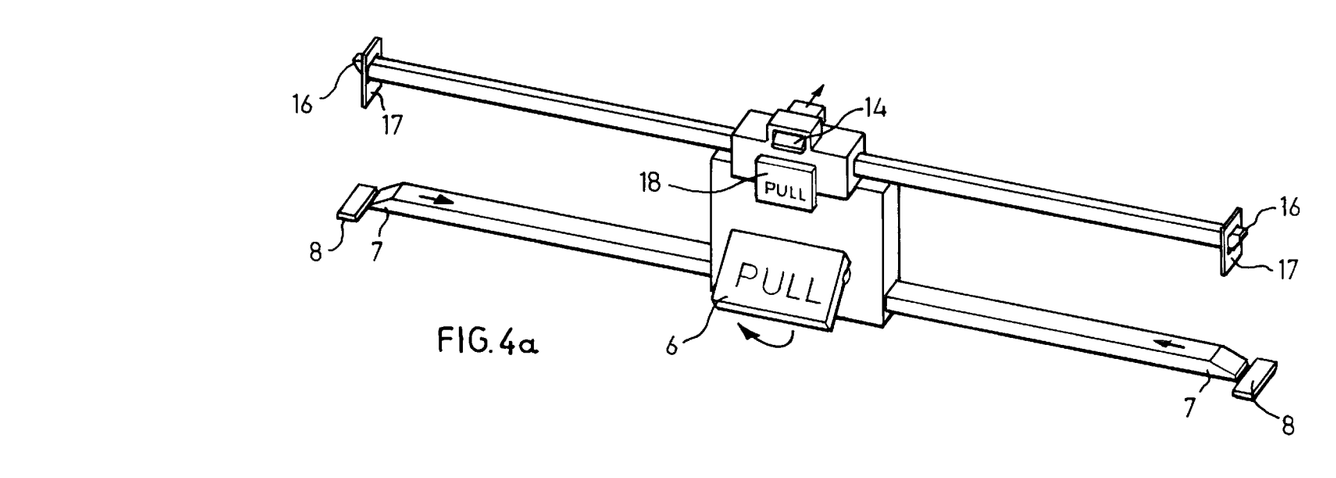
FIGS. 4a and 4b illustrate two stages in the operation of the locking mechanisms in the stowage compartments of FIG. 1.
Figure 4B:
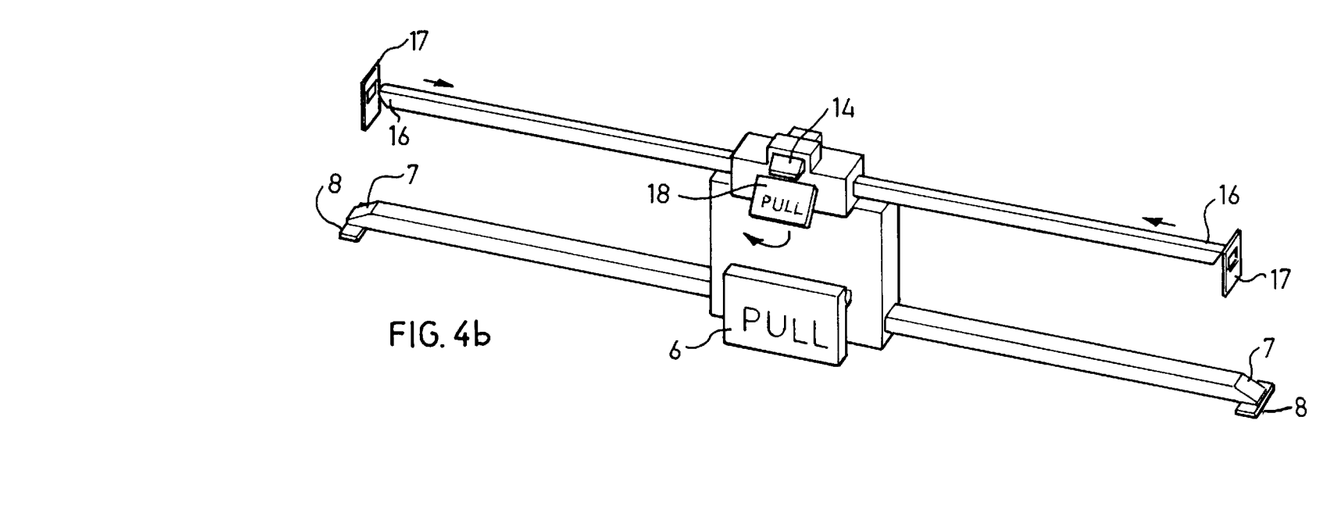

This downward pivoting of lower compartment section 2 with the inner cover 10 exposes handle 18 of the locking mechanism in the inner cover. Handle 18 must thus be manually grasped by the user and pivoted (FIGS. 2d and 4b). This pivotal movement of handle 18 moves locking tongues 16 in the locking mechanism of the inner cover 10 from their locking positions (FIG. 4a) to their released positions (FIG. 4b) with respect to elements 17 of the lower compartment section 2. As soon as the inner cover 10 has thus been released from the lower compartment section 2, its spring members 12, which had been under tension in the closed condition of the inner cover, are now permitted to relax, to pivot the inner cover 10 to its open position with respect to the lower compartment sectin 2, as shown in FIG. 2e.

The stowage compartment may be closed in the conventional manner, by merely grasping the lower compartment section 2 and pivoting it upwardly. The lower compartment section 2 is thus pivoted with the inner cover 10 to the closed positions of both, as illustrated in FIG. 2a, and locked in this closed position by locking tongues 7 of compartment section 2 engageable with fixed elements 8, locking tongues 16 of the inner cover 10 engageable with element 17 of the lower compartment section 2, and locking tongue 14 engageable with fixed element 15 of the supporting structure in which the stowage compartment is mounted.

The Stowage Compartment of FIGS. 6a–8

FIGS. 6a–8 illustrate the invention embodied in a stowage compartment of the type wherein the lower compartment section, therein designated 102, is fixed, whereas the upper compartment section 103, serving as the outer cover, is pivotal upwardly about axis 104 in order to provide access into the interior of compartment section 102. Such a stowage compartment also includes a locking mechanism having a locking tongue 107, and a handle 106 which is manually engageable by the user to release the locking mechanism for pivoting the outer cover 103 to its open position.

In accordance with the present invention, such a stowage compartment is also provided with an inner cover, generally designated 110, pivotally mounted to the fixed lower compartment section 102 under the outer cover 103. Thus, the inner cover 110 is pivotally mounted at its upper end about pivot axis 111, and carries at its lower end a locking mechanism including a locking tongue 117 and a handle 118 which must be manually engaged by the user and pivoted in order to move the inner cover to its open position with respect to the fixed compartment section 102.

Figures 6A, 6B, 6C, 6D, 6E:
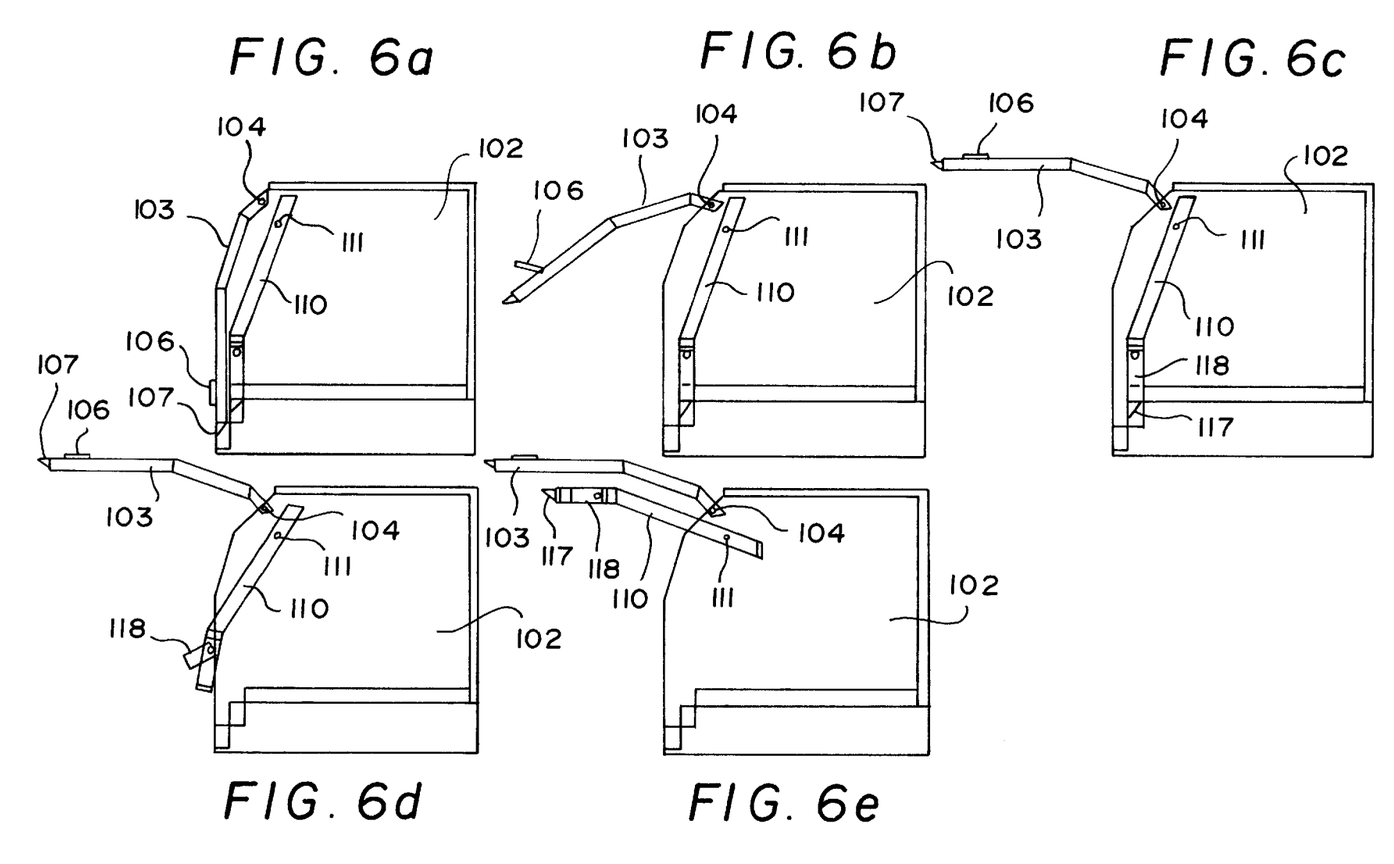
FIGS. 6a–6e diagrammatically illustrate another stowage compartment constructed in accordance with the present invention, in the various conditions of such a stowage compartment.
Figure 7:
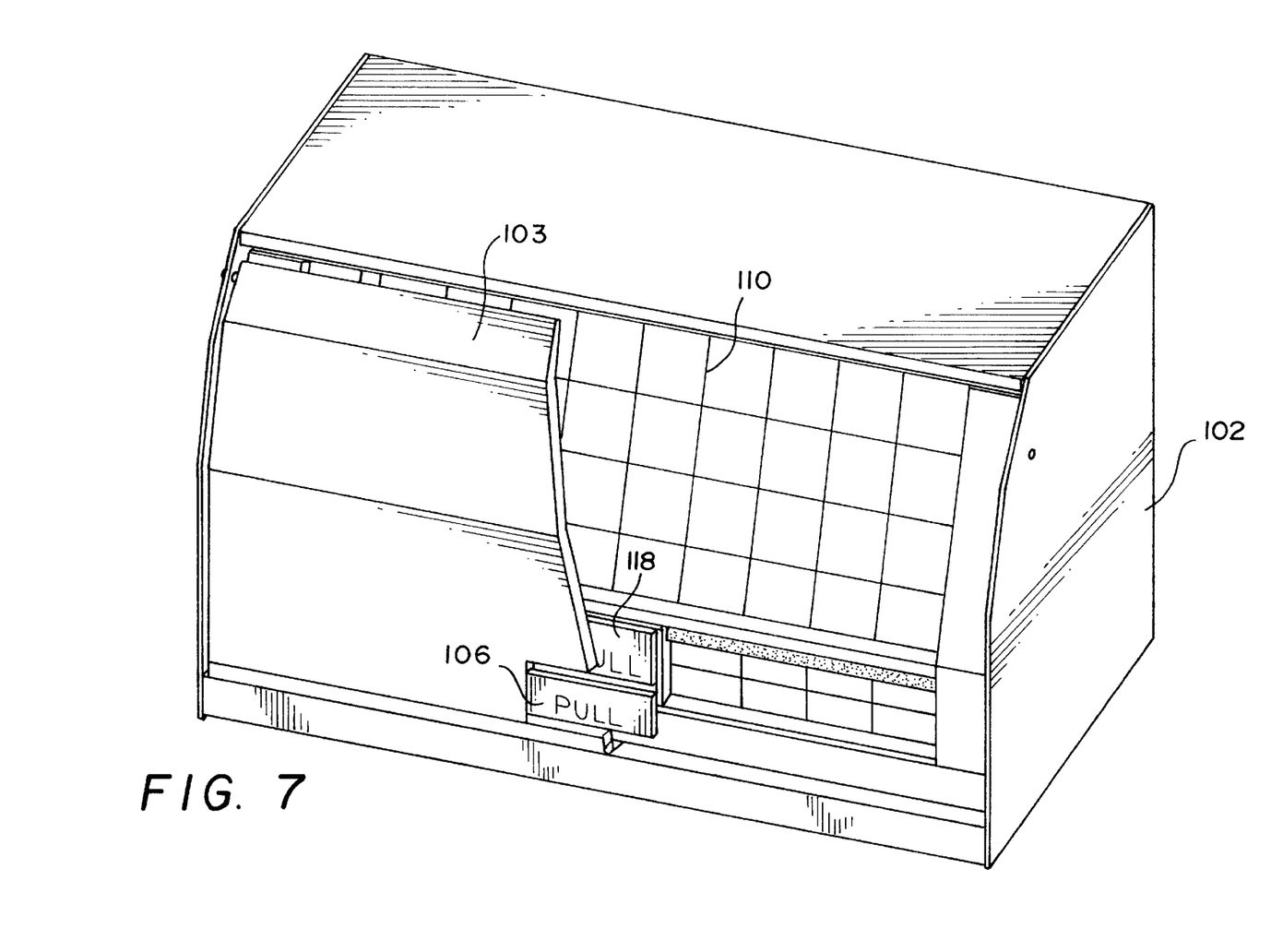
Figure 8:
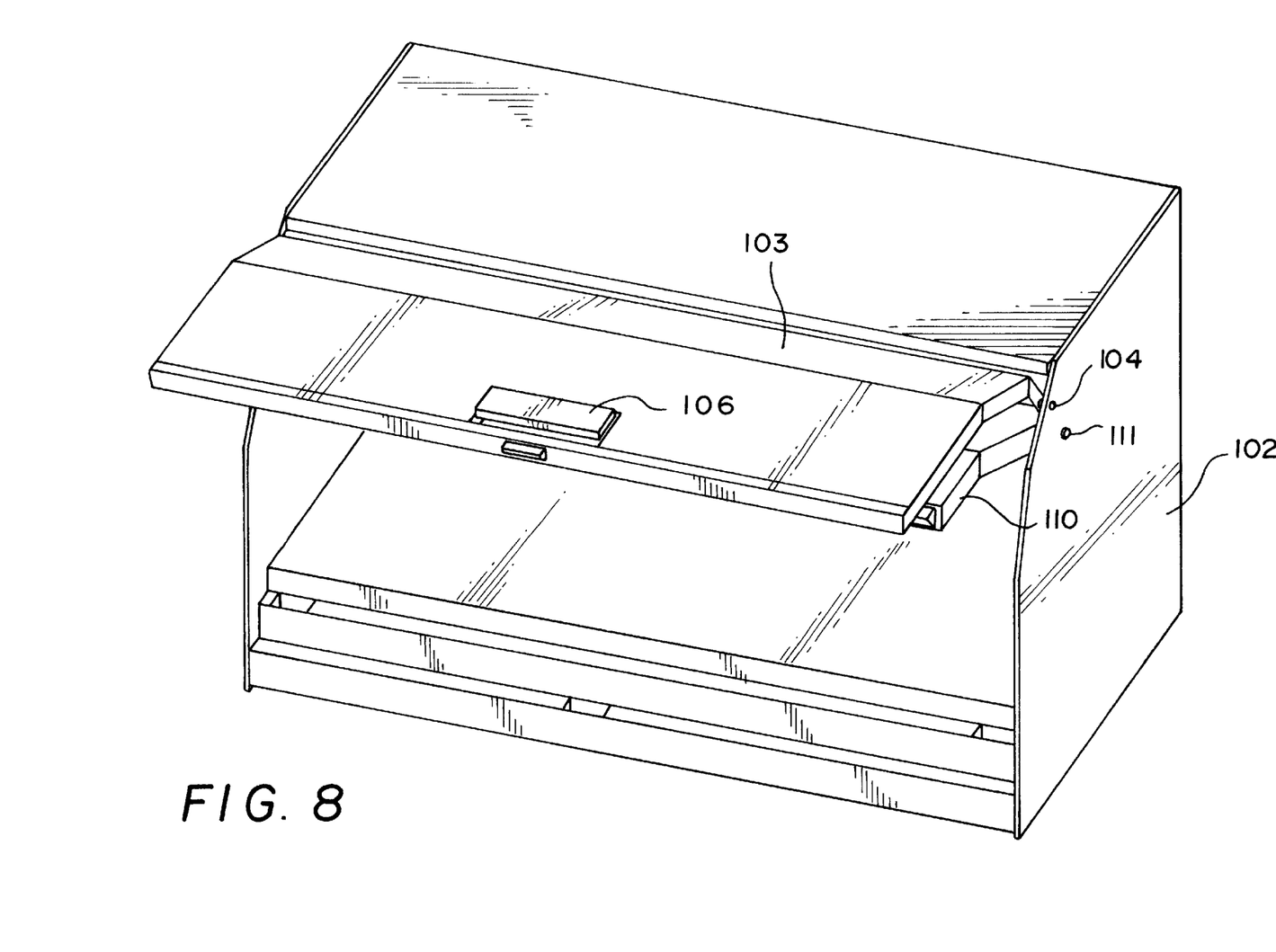
FIG. 8 illustrates the stowage compartment of FIGS. 6a–6e in the fully open condition as shown in FIG. 6e.

As shown in FIGS. 6a and 7, when the outer cover 103 is in its closed position with respect to the fixed compartment section 102, the outer cover exposes handle 106 of the outer cover locking mechanism, but covers handle 118 of the locking mechanism for the inner cover 110. Accordingly, as shown in FIG. 6b, the outer cover 103 must first be pivoted to its open position before handle 118 is accessible to the user for opening the inner cover 110. The construction of the stowage compartment of FIGS. 6a–8 thus provides the same safety feature as the construction of FIGS. 1–5b of preventing the accidental opening of the stowage compartment, e.g., during flights, and the hurling out of an article therefrom, since even if the outer cover 103 should accidentally open, the inner cover 110 will hold the contents within the compartment until it is intentionally opened by moving handle 118. Closing the outer cover 103 automatically also closes the inner cover 110.

As shown particularly in FIG. 7, the inner cover 110 is also preferably of an open, flexible screen construction to retain the articles within the compartment but to permit viewing of the compartment contents. Instead of using an open screen construction, the same result can be obtained, not only in the stowage compartment of FIGS. 6a–8 but also in the stowage compartment construction of FIGS. 1–5b, by making the inner cover 110 (or 10) of a transparent plastic construction, preferably of a flexible transparent sheet.

While the invention has been described with respect to two preferred embodiments, it will be appreciated that these are set forth merely for purposes of example, and that many other variations, modifications and applications of the invention may be made.

I claim:

1. A stowage compartment to be mounted in a supporting structure, comprising: a lower compartment section for receiving articles to be stowed; an upper compartment section serving as an outer cover for the lower compartment section; said upper compartment section being fixed to the supporting structure, and said lower compartment section being pivotal to a closed position or to an open position with respect to said upper compartment section; and a compartment locking mechanism for locking said two compartment sections together when the lower compartment section is in its closed position with respect to the upper compartment section; said compartment locking mechanism including a handle manually engageable by a user for releasing the compartment locking mechanism to permit pivoting the lower compartment section to its open position with respect to the upper compartment section;

characterized in that said stowage compartment further comprises:

an inner cover between the lower compartment section and the upper compartment section, and pivotal to a closed position or to an open position with respect to the lower compartment section;

and an inner cover locking mechanism for locking the inner cover to the lower compartment section when the inner cover is in its closed position with respect to the lower compartment section, said inner cover locking mechanism also including a handle manually engageable by a user for releasing the inner cover locking mechanism to permit pivoting the inner cover with respect to the lower compartment section;

said upper compartment section, in the closed position of said lower compartment section, covering said handle of the inner cover locking mechanism such as to permit manual access thereto, in order to release the inner cover locking mechanism, only after the lower compartment section has been pivoted to its open position with respect to the upper compartment section;

said inner cover locking mechanism including a first locking element for locking the inner cover to the supporting structure, and a second locking element for locking the inner cover to the pivotal lower compartment section;

said handle of the compartment locking mechanism also being effective to release said first locking element of the inner cover locking mechanism, to permit the lower compartment section, with the inner cover, to be pivoted to the open position with respect to the fixed upper compartment section.

2. The stowage compartment according to claim 1, wherein said inner cover is of a construction which, when in its closed position, covers the open end of the fixed compartment section to secure the articles therein but permits viewing therethrough of the articles in the lower compartment section.

3. The stowage compartment according to claim 2, wherein said inner cover is of an open, flexible screen construction.

4. The stowage compartment according to claim 2, wherein said inner cover is a transparent, flexible plastic sheet.

5. The stowage compartment according to claim 1, wherein said inner cover is automatically closed, and its locking mechanism is automatically locked, by the movement of the pivotal compartment section to its closed position with respect to the fixed compartment section.

6. The stowage compartment according to claim 1, wherein said inner cover is biassed to an open position by a spring such that, after the lower compartment section has been pivoted downwardly with respect to the upper compartment section, the inner cover automatically opens when the handle of the inner cover locking mechanism is manually moved to its releasing position.

7. An aircraft including a stowage compartment according to claims 1, mounted in its supporting structure.

8. A stowage compartment to be mounted in an overhead supporting structure of an aircraft, comprising:

a lower compartment section for receiving articles to be stowed;

an upper compartment section serving as an outer cover for the lower compartment section; said upper compartment section being fixed to the supporting structure, and said lower compartment section being pivotal to a closed position or to an open position with respect to said upper compartment section;

a compartment locking mechanism for locking said two compartment sections together when the lower compartment section is in its closed position with respect to the upper compartment section;

said compartment locking mechanism including a handle manually engageable by a user for releasing the compartment locking mechanism to permit pivoting the lower compartment section to its open position with respect to the upper compartment section;

an inner flexible cover between the lower compartment section and the upper compartment section, and pivotal to a closed position or to an open position with respect to the lower compartment section;

an inner cover locking mechanism for locking the inner cover to the lower compartment section when the inner cover is in its closed position with respect to the lower compartment section, said inner cover locking mechanism also including a handle manually engageable by a user for releasing the inner cover locking mechanism to permit pivoting the inner cover with respect to the lower compartment section;

said inner cover being automatically closed, and its locking mechanism being automatically locked, by the movement of the lower compartment section to its closed position with respect to the upper compartment section;

said upper compartment section, in the closed position of said lower compartment section, covering said handle of the inner cover locking mechanism such as to permit manual access thereto, in order to release the inner cover locking mechanism, only after the lower compartment section has been pivoted to its open position with respect to the upper compartment sections;

and a spring biassing said inner cover to an open position with respect to said lower compartment section such that, after the lower compartment section has been pivoted to its open portion with respect to the upper compartment section, the inner cover automatically opens upon moving the handle of the inner cover locking mechanism to its releasing position.

9. The stowage compartment according to claim 8, wherein said inner cover is of a construction which, when in its closed position, covers the open end of the fixed compartment section to secure the articles therein but permits viewing therethrough of the articles in the lower compartment section.

10. The stowage compartment according to claim 9, wherein said inner cover is of an open, flexible screen construction.

11. The stowage compartment according to claim 9, wherein said inner cover is a transparent, flexible plastic sheet.

12. The stowage compartment according to claim 8, wherein said inner cover locking mechanism includes a first locking element for locking the inner cover to the supporting structure, and a second locking element for locking the inner cover to the pivotal lower compartment section; said handle of the compartment locking mechanism also being effective to release said first locking element of the inner cover locking mechanism, to permit the lower compartment section, with the inner cover, to be pivoted to the open position with respect to the fixed upper compartment section.

13. The stowage compartment according to claim 8, wherein said inner cover is pivotally mounted to the lower compartment section by a bracket secured to the lower compartment section; and wherein said spring biassing said inner cover to an open position with respect to said lower compartment section is secured between one side of said lower compartment section and an arm fixed to said bracket.

14. The stowage compartment according to claim 8, wherein said inner cover is pivotally mounted to said lower compartment section by a pair of brackets secured to the opposite sides of the lower compartment section; and wherein said spring biassing said inner cover to an open position with respect to said lower compartment section, includes a pair of springs secured between said opposite sides of the lower compartment section and arms fixed to said brackets.

15. The stowage compartment according to claim 8, wherein said inner cover locking mechanism further includes a pair of locking tongues extending from the opposite sides of said inner cover and movable by said handle of the inner cover locking mechanism laterally outwardly to a locking position engageable with elements fixed at the opposite ends of said lower compartment section, and inwardly to a releasing position with respect to said elements.

16. A stowage compartment to be mounted in a supporting structure, comprising:

a lower compartment section for receiving articles to be stowed;

an upper compartment section serving as an outer cover for the lower compartment section; said upper compartment section being fixed to the supporting structure, and said lower compartment section being pivotal to a closed position or to an open position with respect to said upper compartment section;

a compartment locking mechanism for locking said two compartment sections together when the lower compartment section is in its closed position with respect to the upper compartment section; said compartment locking mechanism including a handle manually engageable by a user for releasing the compartment locking mechanism to permit pivoting the lower compartment section to its open position with respect to the upper compartment section;

an inner cover between the lower compartment section and the upper compartment section, and pivotal to a closed position or to an open position with respect to the lower compartment section;

and an inner cover locking mechanism for locking the inner cover to the lower compartment section when the inner cover is in its closed position with respect to the lower compartment section;

said inner cover locking mechanism also including a handle manually engageable by a user for releasing the inner cover locking mechanism to permit pivoting the inner cover with respect to the lower compartment section, and a pair of locking tongues extending from the opposite sides of said inner cover and movable by said handle of the inner cover locking mechanism laterally outwardly to a locking position engageable with elements fixed at the opposite ends of said lower compartment section, and inwardly to a releasing position with respect to said elements;

said upper compartment section, in the closed position of said pivotal compartment section, covering said handle of the inner cover locking mechanism such as to permit manual access thereto, in order to release the inner cover locking mechanism, only after the pivotal compartment section has been pivoted to its open position with respect to the fixed compartment section.

17. The stowage compartment according to claim 16, wherein said stowage compartment further comprises a spring biassing said inner cover to an open position with respect to said lower compartment section such that, after the lower compartment section has been pivoted to its open position with respect to the upper compartment section, the inner cover automatically opens upon moving the handle of the inner cover locking mechanism is manually moved to its releasing position.

18. The stowage compartment according to claim 17, wherein said inner cover is pivotally mounted to the lower compartment section by a bracket secured to the lower compartment section; and wherein said spring biassing said inner cover to an open position with respect to said lower compartment section is secured between one side of said lower compartment section and an arm fixed to said bracket.

19. The stowage compartment according to claim 16, wherein said inner cover is pivotally mounted to said lower compartment section by a pair of brackets secured to the opposite sides of the lower compartment section, and by a pair of springs biassing said inner cover to an open position with respect to said lower compartment section, said springs being secured between said opposite sides of the lower compartment section and arms fixed to said brackets.

20. The stowage compartment according to claim 16, wherein said inner cover locking mechanism includes a first locking element for locking the inner cover to the supporting structure, and a second locking element for locking the inner cover to the pivotal lower compartment section;

said handle of the compartment locking mechanism also being effective to release said first locking element of the inner cover locking mechanism, to permit the lower compartment section, with the inner cover, to be pivoted to the open position with respect to the fixed upper compartment section.

* * * * *